Figure 1:
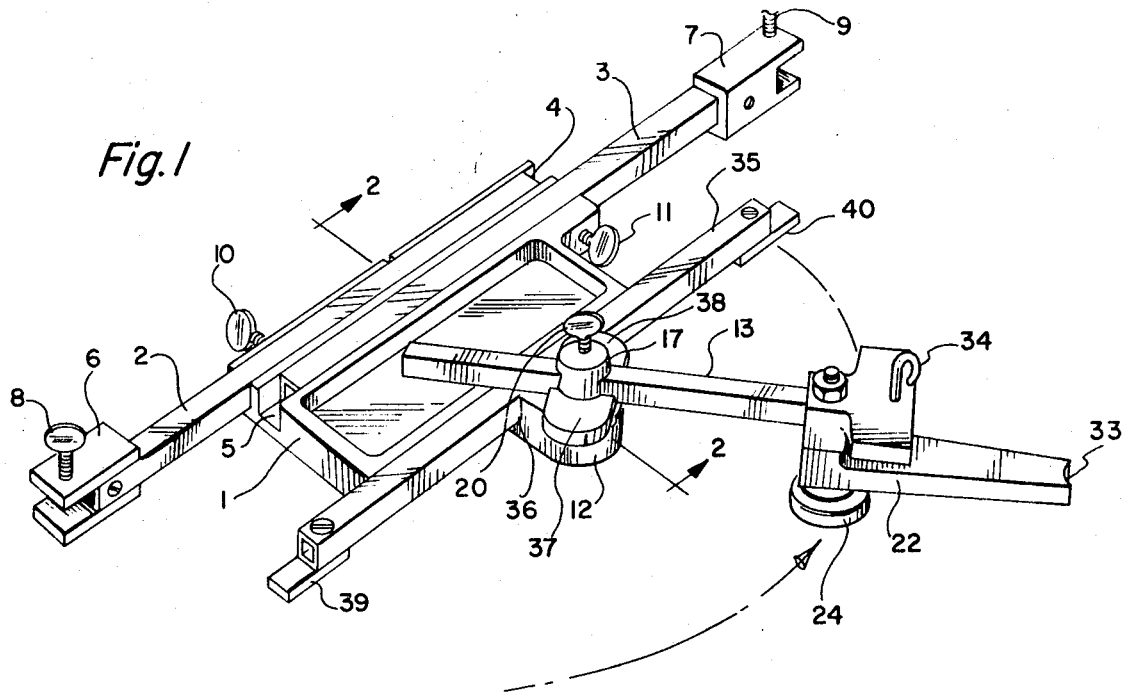

United States Patent [19]
Wing

[11] 3,716,085
[45] Feb. 13, 1973

[54] ROUTER TEMPLATE ATTACHMENT

[76] Inventor: Albert L. Wing, 1220 McKemy Street, Tempe, Ariz.

[22] Filed: Sept. 20, 1971

[21] Appl. No.: 182,009

[52] U.S. Cl. .................................. 144/144 R, 90/13
[51] Int. Cl. .............................................. B27c 5/00
[58] Field of Search ....... 144/144, 144.5, 137; 90/12, 90/13

[56] References Cited

UNITED STATES PATENTS

| | | | |
|---|---|---|---|
| 3,540,130 | 11/1970 | French | 144/144.5 X |
| 3,402,640 | 9/1968 | Eisenbach | 144/144 X |
| 2,838,838 | 6/1958 | Lica | 144/144.5 UX |

Primary Examiner—Andrew R. Juhasz
Assistant Examiner—W. Donald Bray
Attorney—William C. Cahill et al.

[57] ABSTRACT

A router template attachment is provided for attachment to and use in conjunction with a known type of router template for the purpose of providing the capability for routing arcuate pattern portions. Adjustable arms extend outwardly for securing the attachment to the router template frame. A router support arm is fixed for pivotal movement between positions along an arcuate path of radius determined by sliding the router support arm over its pivot point at which it is fixed by means of a thumbscrew or the like. Circumferential travel is limited to a maximum of 180° by means of a stop member which slides from side to side to intercept the router support arm.

2 Claims, 3 Drawing Figures

ROUTER TEMPLATE ATTACHMENT

This invention relates to the wood working arts and, more particularly, to apparatus for use in conjunction with a router template to extend the pattern capabilities of such a template.

The router template described in my U.S. Pat. No. 3,199,556 allows a craftsman to rout a variety of ornamental designs on doors and the like. However, certain ornamental designs which enjoy considerable popularity require the routing of an arcuate portion extending wholly or partially across one or both ends of the design to provide an arch or cathedral effect. While such designs can be routed on my router template described in U.S. Pat. No. 3,199,556, it is necessary to use a specific template insert for each configuration contemplated. For that reason, it has been determined that much greater versatility may be achieved by using the adjustable routing template attachment which constitutes the present invention in conjunction with my prior router template whereby arcuate pattern portions of any desired radius can be incorporated into the ornamental design being routed.

It is therefore a broad object of my invention to provide a router template attachment which permits the operator to incorporate arcuate pattern portions into his design.

It is a more specific object of my invention to provide such a router template attachment which can be incorporated into existing router templates such as that described in my U.S. Pat. No. 3,199,556.

Another object of my invention is to provide a routing template attachment which is simple and economical to make, yet reliable and sturdy in operation during extended commercial use.

The subject matter of the invention is particularly pointed out and distinctly claimed in the concluding portion of the specification.

Figure 2:
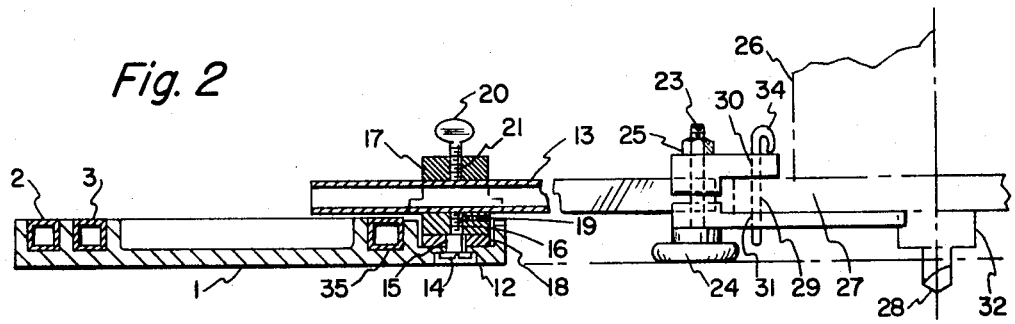
Figure 3:
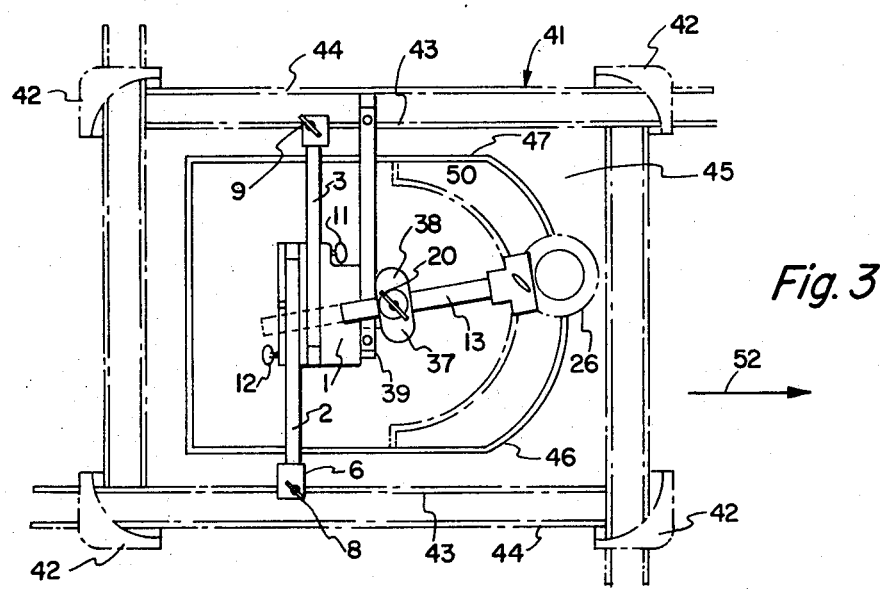

The invention, however, both as to organization and method of operation, may best be understood by reference to the following description taken in connection with the accompanying drawing of which:

FIG. 1 is a perspective view of the attachment according to the present invention;

FIG. 2 is a cross-sectional view taken along the line 2—2 of FIG. 1 to more clearly illustrate the manner in which the various components of the attachment are coupled together; and FIG. 3 is a top plan view of the attachment as it may be used in an exemplary configuration as an attachment to the routing template described in my U.S. Pat. No. 3,199,556.

Referring now to FIG. 1, it will be observed that the attachment includes a cast frame member 1 which carries the several adjustable components. First and second longitudinally adjustable arms 2 and 3 slide in corresponding channels 4 and 5, respectively, for attachment to the router template. The longitudinally adjustable arms 2 and 3 carry template engaging portions 6 and 7 at their outer ends. The template engaging portions include thumbscrew means 8 and 9 for securing the attachment to the rails of the template. Similar thumbscrew means 10 and 11 pass through threaded apertures in the frame member 1 to engage, respectively, the longitudinally adjustable arms 2 and 3 to permit adjustment to the width of the template with which the attachment is to be utilized.

Referring simultaneously to FIGS. 1 and 2, it will be observed that a forward extension 12 of the frame member 1 carries a router support arm 13 for pivotal movement about an axis defined by a screw 14 having a shoulder portion 15 and a threaded portion 16 which threadingly engages a pivot member 17 through which the router support arm 13 passes. The lower portion of the pivot member 17 rests on a bushing 18 to insure against binding when the router support arm is swung through an arcuate path. A set screw 19 is threaded onto the lower portion of pivot member 17 to bear against the threaded portion 16 of the set screw 14 to prevent the screw from working loose during repeated pivotal motion of the pivot member 17. A thumbscrew 20 passes downwardly through a threaded opening 21 in the upper portion of the pivot member 17 to bear upon the upper surface of the router support arm 13 thereby constraining the router support arm against longitudinal movement during operation and permitting the operator to adjust the radius of the arcuate path at will by loosening the thumbscrew 20 and sliding the arm 13 to the desired position after which the thumbscrew 20 may be retightened.

A router support frame 22 is fixed to the outer end of the router support arm 13 by a screw 23 having a smooth head portion 24 which serves as a load bearing surface during the routing operation. A nut 25 threaded onto the threads of the screw 23 is tightened to fix the router support frame securely to the end of the router support arm 13.

Attention is specifically directed to FIG. 2 in which a router 26 having a guide plate 27 and a bit 28 is shown fixed to the router support frame 22. The router guide plate 27 is drilled at a predetermined position in a direction parallel to the longitudinal axis of the bit 28 to provide a vertical opening 29 which is in alignment with corresponding openings 30 and 31 in the upper and lower portions, respectively, of the router support frame 22. In this position, the lower bearing housing 32 of the router is snuggly held against the outermost terminus 33, best shown in FIG. 1, of the router support frame 22. Thus, the router may be securely fixed to the attachment by aligning the opening 29 with the openings 30 and 21, and dropping a key 34 through the aligned openings.

A stop member 35 is used to limit the arc through which the router is swung to a maximum of 180°. The stop member 35, best shown in FIG. 1, is slidingly constrained in a channel 36 within the frame member 1 by outwardly extending wings 37 and 38 of the pivot member 17 and the rearwardly extending portion of the router support arm 13. The stop member 35 is free to move longitudinally between two extreme positions limited by outboard stops 39 and 40. Each of the lower outboard stops 39 and 40 extend beyond the ends of the stop member 35 from the underneath portion thereof to slide beneath the rails of the template as will be presently described.

FIG. 3 depicts the attachment of the present invention in place on a router template 41 constructed in accordance with my previously referenced U.S. Pat. No. 3,199,556. As more completely described in the specification of that patent, the router template 41 comprises four corner engaging assemblies 42 which slidably receive inner and outer bars 43 and 44 respectively for adjustment to accommodate a panel which is supported by the template in a manner completely described in the referenced U.S. Pat. No. 3,199,556. The attachment of the present invention is fixed within the template 41 by extending the longitudinally adjustable arms 2 and 3 until the template engaging portions 6 and 7 on the outboard ends of the arms are positioned astride opposing inner bars 43 of the template whereupon the thumbscrews 8, 9, 11, and 12 are tightened thereby fixing the frame member 1 in position resting upon the panel 45 into which an ornamental design is to be routed. With the router support arm 13 fixed in the position shown in solid lines by tightening the thumbscrew 20, the router 26 will cut the arcuate pattern portion 46 which, it will be observed, meets the side portions 47 and 48 of the pattern after describing an arc of less than 180°. If, however, the router support arm 13 is slid rearwardly to the position indicated by the dashed lines, the arcuate pattern portion 49, which describes a full 180° and requires connecting pattern portions 50 and 51 to meet the side pattern portions 47 and 48 will be cut into the panel 45. The arc 48 is limited to 180° by the manner in which the lower bearing housing 32, FIG. 2, abuts the stop member 35. When cutting an arcuate pattern portion which extends a full 180° sweep, the stop member 35 is first slid to one side, such as the position shown in FIG. 3, to define the starting position. Once routing of the arcuate portion of the pattern is started, the stop member 35 is simply slid to its other extreme position at which the stop 39 fits beneath the inner rail 43 and serves, in that position, to define the terminal point of the arcuate pattern portion. Those skilled in the art will appreciate that ordinarily a 180° arcuate pattern portion 48 would be cut to provide a more symmetrical and pleasing appearance than shown in FIG. 3, and that this can be achieved by simply moving the entire attachment in the direction of the arrow 52 to provide a commensurate shift in the position of the arctuate pattern portion 48. Thus, it will be understood that a complete range of arcuate pattern portions can be provided in accordance with the designs of the individual craftsman and that, once set up, this pattern can be repeated as often as desired. Similarly, it will be apparent that symmetrical arcs can be cut at either end of the pattern as the frame 45 is simply reversed with respect to the attachment once the first arcuate pattern portion has been cut.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An attachment for a router template of the type utilized in routing ornamental designs in panels, the router including side rails, said attachment comprising:
   A. a frame, said frame including first and second closely adjacent, parallel channels;
   B. first and second longitudinally adjustable arms slidingly disposed, respectively, for a range of adjustment within said first and second channels;
   C. first and second securing means fixed, respectively, to the outboard ends of said first and second arms, said securing means adapted to engage the template side rails thereby fixing said attachment into place within the router template;
   D. first and second means for selectively fixing said first and second arms in predetermined positions along their range of adjustment in said first and second channels;
   E. a third longitudinally adjustable arm, said third arm adapted at one end thereof to receive and support a router;
   F. pivot means coupled to said frame and slidably supporting said third arm for a range of longitudinal adjustment and pivotal movement with respect thereto in a plane parallel to the plane described by the longitudinal axes of said first and second arms; and
   G. tightening means for selectively fixing said third longitudinally adjustable arm in a predetermined position along its range of adjustment.

2. The attachment of claim 1 in which said frame further includes a third channel parallel to said first channel and disposed proximate said pivot means and which further comprises:
   A. a fourth longitudinally adjustable arm slidingly disposed in said third channel; and
   B. stop means fixed to each end of said fourth arm and adapted to abut said frame to limit longitudinal travel in each direction to a predetermined maximum; said fourth longitudinal arm thereby functioning as a stop means for said third longitudinal arm selectively limiting pivotal motion thereof to a maximum of approximately 180°.

* * * * *